United States Patent

[11] 3,630,104

| [72] | Inventor | Richard Morton Milner |
| | | Watford, England |
| [21] | Appl. No. | 6,068 |
| [22] | Filed | Jan. 27, 1970 |
| [45] | Patented | Dec. 28, 1971 |
| [73] | Assignee | National Research Development Corporation |
| | | London, England |
| [32] | Priority | Jan. 28, 1969 |
| [33] | | Great Britain |
| [31] | | 4,650/69 |

[54] MEASURING DEVICES
1 Claim, 1 Drawing Fig.

[52] U.S. Cl. ........................................... 81/3 J, 73/143, 33/137
[51] Int. Cl. ........................................... G01l 5/04
[50] Field of Search ........................................... 81/3 J, 3 R; 33/137; 73/141 AB, 143, 145

[56] References Cited
UNITED STATES PATENTS

| 3,432,930 | 3/1969 | Ljungberg | 33/137 |
| 3,424,038 | 1/1969 | Smith | 81/3 J |

OTHER REFERENCES

Technical Bulletin, Spring Design Data, Section 6, pp. 1–8, Hunter Spring Co.

*Primary Examiner*—Theron E. Condon
*Assistant Examiner*—Roscoe V. Parker, Jr.
*Attorney*—Cushman, Darby & Cushman ABSTRACT: A tension control device for use with a measuring tape, which device comprises a housing containing spring means connected between a fixed part of the housing and tape clamping means carried by the housing but movable relative thereto, the spring means being adapted to exert a substantially constant tension when extended by relative movement of the tape clamping means, the tape clamping means being adapted for releasable securement to a tape at any point along its length, and the housing being formed to provide a handle.

PATENTED DEC 28 1971
3,630,104
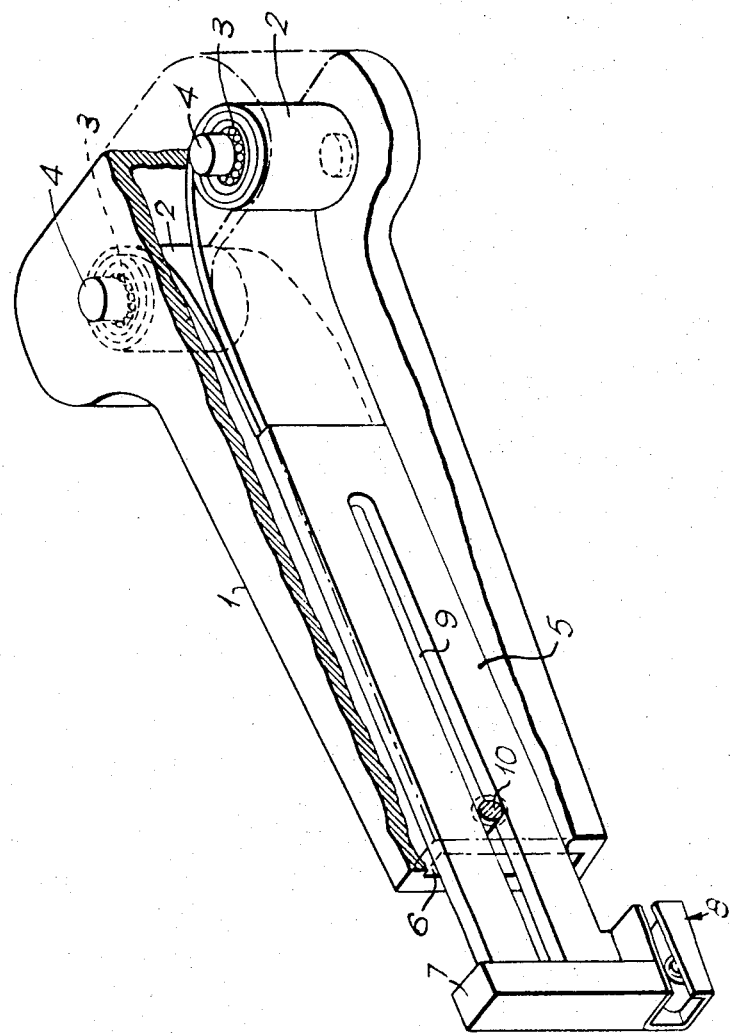

MEASURING DEVICES

This invention concerns measuring devices and more particularly tension control devices for use with flexible measures such as steel tapes.

For accurate work, flexible steel tapes should only be used under an appropriate tension, related to the tension applied during the initial tape calibration. In the past, this tension has been applied with a small spring balance, but the method has been clumsy in use, requiring some skill, and in consequency has not been widely adopted. An easier and more reliable method of tensing the tape has therefore been sought.

It has in fact been proposed previously to incorporate a tension control device with the reel of a tape measure, but this leads to some complexity relative to the basically simple reel and it is accordingly costly. Also such a device is necessarily associated with the one tape reel.

According to the present invention it is proposed that a tension control device for use with a measuring tape comprises a housing containing spring means connected between a fixed part of the housing and tape clamping means carried by the housing but movable relative thereto, the spring means being adapted to exert a substantially constant tension when extended by relative movement of the tape clamping means, the tape clamping means being adapted for releasable securement to a tape at any point along its length, and the housing being formed to provide a handle.

The separation of the presently proposed device from a specific tape reel is advantageous in affording simplicity of construction, and also in that the device can be used with different tapes.

For a clearer understanding of the present invention, the same will now be described by way of example with reference to the accompanying drawing.

The drawing shows an embodiment of a tension control device comprising a hollow, generally T-shaped housing 1 which is partly broken away to better show the interior. Two constant tension springs 2 in the form of coiled spring strip are mounted around respective bearings 3 on spindles 4, the spindles extending across the interior of respective halves of the crossbar of the T-shape and perpendicularly to the plane of such shape. The springs are of opposite hand with their other ends converging towards the longitudinal plane of the housing where they are connected to one of a slide 5.

The slide is arranged for sliding movement in the aforementioned plane to project at its other, free end from the stem of the T-shaped by way of a slot 6. The free end of the slide carries a stop 7 to limit retraction of the slide into the housing by the springs, and a clamp 8 for releasable securement to a tape at any point along its length. More particularly in the illustrated embodiment, the clamp is in the form of a jamming roller within a longitudinally slit sleeve.

The slide 5 is longitudinally slotted at 9 and a pin 10 is located to pass across the slot 6 and through slot 9, to act as a stop for the latter.

In use of the illustrated device, a tape is extended for the purposes of measurement with one end fixed at one limit of the dimension to be measured, while part of the tape just beyond the other limit is passed laterally into the clamp sleeve. The device is then gripped as a handle and pulled to tense the tape with the slide partly projecting from the device, whereby the predetermined tension of the springs is exerted on the tape, and the desired measurement taken.

It is important that the device should not be pulled so hard as to extend the slide to the point where it is stopped by pin 10 since this leads immediately to an excess tension being applied to the tape. As indicated above, the embodiment just described is given by way of example and the invention can be embodied in other forms. Thus, the container shaping, while convenient for the components to be contained therein, can take any suitable form, and so also can the clamp. The slide can be marked or colored to indicate the range of useful slide extension. Also, the spring assembly may possible take other forms: the springs need not necessarily be mounted on bearings and spindles, and a single spring can be used. However, the use of two springs as shown compensates for the strong side thrust which otherwise arises with a single coil, and the illustrated arrangement is generally preferred.

Regardless of such possible variations within the more general scope of the invention, it is contemplated that the devices will be made for use with specific tape forms consistent with the selected spring force. For example, the above-described embodiment has been tested with springs affording constant tension of approximately 16 lbs. and a clamp designed to receive ⅜-inch steel tapes and has shown consistent accuracy of ±⅛-inch in 100 ft. compared with ±⅜-inch without tension control.

Now tapes are normally calibrated while subject to constant tension, usually 10 lbs. for tapes up to 100 ft. in length, and the choice of tension to be applied by a device according to the present invention for use with a given tape would normally be the calibration tension for the relevant tape. However, tapes are normally calibrated while in a flat disposition and, as a result, the aforementioned choice of tension will not be fully appropriate to use of the tape for catenary measurement. The latter measurement involves use of the tape stretched freely between two points defining a desired measurement, and it will be seen that tape adopts a catenary disposition having an arc length different from the chord length, the desired measurement. The error arising in catenary measurement can be compensated by increasing the tape tension to effect further tensile stretch, but in practice this clearly cannot be effected precisely for all such measurements since the relevant tension differs for different lengths.

It is proposed that a compromise tension be employed in a device according to the invention to optimize the errors which arise in flat and catenary measurement with a tape for which the device is intended to be used.

For a ⅜-inch wide, 0.008-inch thick steel tape of 100 ft. length calibrated under 10 lbs. tension while flat, a suitable tension for this purpose is approximately 16 lbs. This can be demonstrated by tests which show that the errors in 100 ft. measurement with such a tape range from +⅛ to −⅜-inch for flat measurement and from +⅜ to −¾-inch for catenary measurement without tension control, corresponding errors with 10 lbs. tension are 0 and −⅜-inch, and those with 16 lbs. tension are +1/16 inch and −1/16 inch.

Other tapes widths, or significantly different tape thicknesses will normally require different spring forces.

Naturally any device so adapted for use with a particular tape form should be clearly marked to indicate the intended use. If such devices are to be made available from a common source, in terms of manufacture, with tapes it may be convenient to use a simplified form of marking to distinguish both the devices and tapes in similar manner. For example, a device intended for use with a specific range of tapes can be colored to match the tape coloring on the basis of a distinctive color code to facilitate matching of devices with tapes.

Lastly, it is possible that a more generally useful device according to the invention might be required and this could involve provision of different springs selectively connectable to the slide, say. Alternately, a device could be adapted for interchange of springs.

I claim:

1. A tension control device.
   Adapted for use with a measuring tape of a predetermined maximum length, calibrated, when supported in a flat disposition, while subject to a predetermined first tension, and which tape measures accurately when extended in unsupported catenary suspension only while fixed at one end and having the opposite end of the segment of tape being used subject to a predetermined second tension, different from said first tension,
   Said device including:
   a housing configured to be easily hand held; an elongated slide having an inner end and an outer end; said slide being carried by said housing for longitudinal extension and retraction with respect to the housing, clamp means on the slide adjacent said outer end thereof, said clamp means being configured for securing the clamp means to the measuring tape at a point thereon adjacent said opposite end of the unsupported catenary of the tape; extensible/retractile constant tension spring means having one end secured with respect to the housing and operatively associated with the inner end of the slide for resiliently resisting extension of the clamp means by a constant amount, so long as the constant tension spring means is extended by an amount intermediate the opposite extremes of the extensibility thereof; said constant tension spring means providing a constant tension lying intermediate said first tension and said second tension.

* * * * *